(12) United States Patent
Wei et al.

(10) Patent No.: US 10,748,248 B2
(45) Date of Patent: Aug. 18, 2020

(54) IMAGE DOWN-SCALING WITH PIXEL SETS SELECTED VIA BLUE NOISE SAMPLING

(71) Applicant: Adobe Inc., San Jose, CA (US)

(72) Inventors: Li-Yi Wei, Redwood City, CA (US); Xin Sun, Santa Clara, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/980,367

(22) Filed: May 15, 2018

(65) Prior Publication Data
US 2019/0355095 A1 Nov. 21, 2019

(51) Int. Cl.
*G06T 5/00* (2006.01)
*G06T 3/40* (2006.01)

(52) U.S. Cl.
CPC ............ *G06T 3/4084* (2013.01); *G06T 5/002* (2013.01); *G06T 5/003* (2013.01); *G06T 2207/10024* (2013.01)

(58) Field of Classification Search
CPC ....... G06T 3/4084; G06T 5/002; G06T 5/003; G06T 2207/10024
See application file for complete search history.

(56) References Cited

U.S. PATENT DOCUMENTS

| | | | |
|---|---|---|---|
| 5,363,213 A | 11/1994 | Coward et al. | |
| 6,697,169 B1* | 2/2004 | Feng | H04N 1/52 358/3.03 |
| 6,809,840 B1 | 10/2004 | Yu et al. | |
| 2011/0188744 A1* | 8/2011 | Sun | G06T 5/50 382/162 |
| 2011/0292066 A1* | 12/2011 | Wei | G06T 11/40 345/589 |

FOREIGN PATENT DOCUMENTS

EP 2113884 11/2009

OTHER PUBLICATIONS

Ahmed, Abdalla G. M., et al., "An Adaptive Point Sampler on a Regular Lattice", ACM Transactions Graph, vol. 36, Issue 4, Article 138, Jul. 2017, 13 pages, https://doi.org/10.1145/3072959.3073588.

(Continued)

*Primary Examiner* — Phuoc Tran
(74) *Attorney, Agent, or Firm* — Kilpatrick Townsend & Stockton LLP

(57) ABSTRACT

In some embodiments, a computing device uses a blue noise sampling operation to identify source pixels from an input image defining respective pixel sets. Each pixel set is associated with a respective weight matrix for a down-scaling operation. The blue noise sampling operation causes an overlap region between first and second pixel sets. The computing device assigns an overlap pixel in the overlap region to the first weight matrix based on the overlap pixel being closer to the first source pixel. The computing device modifies the second weight matrix to exclude the overlap pixel from a portion of the down-scaling operation involving the second weight matrix. The computing device performs the down-scaling operation on the input image by combining the first pixel set into a first target pixel with the first weight matrix and combining the second pixel set into a second target with the modified second weight matrix.

20 Claims, 6 Drawing Sheets

(56) References Cited

OTHER PUBLICATIONS

Ahmed, Abdalla G. M., et al., "Low-Discrepancy Blue Noise Sampling", ACM Transactions Graph, vol. 35, Issue 6, Article 247, Nov. 2016, 13 pages, https://doi.org/10.1145/2980179.2980218.

Chen, Jiating, et al., Bilateral Blue Noise Sampling, ACM Transactions Graph, vol. 32, Issue 6, Article 216, Nov. 2013, 13 pages, https://doi.org/10.1145/2508363.2508375.

Cook, Robert L., "Stochastic Sampling in Computer Graphics", ACM Transactions Graph, vol. 5, Issue 1, Jan. 1986, 22 pages, https://doi.org/10.1145/7529.8927.

Ebeida, Mohamed S., et al., "Improving Spatial Coverage While Preserving the Blue Noise of Point Sets", Computer Aided Design, vol. 46, Jan. 2014, 3 pages, https://doi.org/10.1016/j.cad.2013.08.015.

Gastal, Eduardo S. L., et al., "Spectral Remapping for Image Downscaling", ACM Transactions Graph, vol. 36, Issue 4, Article 145, Jul. 2017, 16 pages, https://doi.org/10.1145/3072959.3073670.

Georgiev, Iliyan, et al., "Blue-Noise Dithered Sampling", In SIGGRAPH '16 Talks, Article 35, 1 page, https://doi.org/10.1145/2897839.2927430.

Guenter, Brian, et al., "Quadrature Prefiltering for High Quality Antialiasing", ACM Transactions Graph, vol. 15, Issue 4, Oct. 1996, 22 pages, https://doi.org/10.1145/234535.234540.

Kopf, Johannes, et al., "Content-Adaptive Image Downscaling", ACM Transactions Graph. vol. 32, Issue 6, Article 173, Nov. 2013, 8 pages., https://doi.org/10.1145/2508363.2508370.

Mavridis, Pavlos, et al., "High Quality Elliptical Texture Filtering on GPU", Proceedings of ACM SIGGRAPH in I3D 'Nov. 23-30, 2011, 8 pages https://doi.org/10.1145/1944745.1944749.

McCormack, Joel, et al., Feline: Fast Elliptical Lines for Anisotropic Texture Mapping. In SIGGRAPH, 1999, 8 pages, https://doi.org/10.1145/311535.311562.

Mitchell, Don P, et al., "Reconstruction Filters in Computer Graphics" In SIGRRAPH ' Computer Graphics, vol. 22, No. 4, 1988, 8 pages, https//doi.org/10.1145/54852.378514.

Nehab, Diego, et al., "Fresh Look at Generalized Sampling", Found Trends. Computer Graph. Vis. 8, Mar. 1, 2014, 87 pages, https://doi.org/101561/0600000053.

Ostromoukhov, Victor., "A Simple and Efficient Error-Diffusion Algorithm" In SIGGRAPH 2001, 6 pages, https://doi.org/10.1145/383259.383326.

Öztireli, a. Cengiz, et al., "Perceptually Based Downscaling of Images", ACM Transactions Graph. vol. 34, Issue 4, Article 77, Jul. 2015, 10 pages., https://doi.org/10.1145/ 2766891.

Ramanarayanan, G, et al., "Feature-Based Textures", In EGSR, Cornell University Computing and Information Science Technical Report May 2004, 10 pages.

Pradeep Sen, "Silhouette Maps for Improved Texture Magnification", In Graphics Hardware, HWWS 2004, 10 pages, https://doi.org/10.1145/1058129.1058139.

Tumblin, Jack, et al., "Bixels: Picture Samples with Sharp Embedded Boundaries", . In Eurographics Symposium, 2004, 10 pages., https://doi.org/10.2312/EGWR/EGSR04/255-264.

Ulichney, Robert, "Digital Halftoning", . 1987, MIT Press, Cambridge, MA, USA, 3 pages.

Ulichney, Robert A., "Dithering With Blue Noise", Proceedings IEEE, vol. 76, Issue 1, 1988, 20 pages.

Weber, Nicolas, et al., "Rapid, Detail-Preserving Image Downscaling", ACM Transactions Graph., vol. 35, Issue 6, Article 205, Nov. 2016, 6 pages, https://doi.org/10.1145/2980179.2980239.

Wei, Li-Yi, "Parallel Poisson Disk Sampling", ACM Transactions Graph. vol. 27, Issue 3, Article 20, Aug. 2008, 10 pages, https://doi.org/10.1145/1360612.1360619.

Wei, Li-Yi, "Multi-class Blue Noise Sampling", ACM Transactions Graph, vol. 29, Issue 4, Article 79, Jul. 2010, 8 pages, https://doi.org/10.1145/1778765.1778816.

Search Report from related GB Application No. 1817372.4 dated Apr. 23, 2019, 6 pages.

\* cited by examiner

IMAGE DOWN-SCALING WITH PIXEL SETS SELECTED VIA BLUE NOISE SAMPLING

TECHNICAL FIELD

This disclosure relates generally transforming an input image to a lower resolution, or down-scaled, image. More specifically, but not by way of limitation, this disclosure relates to down-scaling images by selecting pixel sets via blue noise sampling.

BACKGROUND

Image editing applications are often used to generate smaller images through down-scale resampling. For instance, image editing applications have the ability to down-scale images by transforming an input image into an output image with a reduced resolution. Down-scaling operations inherently reduce the amount of information included in the output image as compared to the input image, and are therefore prone to various artifacts, including blur, noise, and aliasing.

Existing down-scale resampling techniques involve a tradeoff between blur and aliasing, which is often considered the least desired artifact as a result of resampling. In one example, nearest neighbor resampling, which is one down-scale resampling technique, produces output images with minimal blurring but with the high aliasing. In another example, As a result, techniques such as bi-linear resampling and bi-cubic resampling produce down-scaled results with less aliasing but more blur (e.g., by pre-filtering the input image before down-scale resampling). Thus, existing methods for image down-scaling fail to generate down-scaled images with reduced blur and aliasing.

SUMMARY

Certain embodiments involve down-scaling images by selecting pixel sets via blue noise sampling. For example, a computing device uses a blue noise sampling operation to identify source pixels from an input image defining respective pixel sets. Each pixel set is associated with a respective weight matrix for a down-scaling operation. The blue noise sampling operation causes an overlap region between first and second pixel sets. The computing device assigns an overlap pixel in the overlap region to the first weight matrix based on the overlap pixel being closer to the first source pixel. The computing device modifies the second weight matrix to exclude the overlap pixel from a portion of the down-scaling operation involving the second weight matrix. The computing device generates a down-scaled image by performing the down-scaling operation on the input image. Performing the down-scaling operation involves combining the first pixel set into a first target pixel with the first weight matrix and combining the second pixel set into a second target with the modified second weight matrix.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
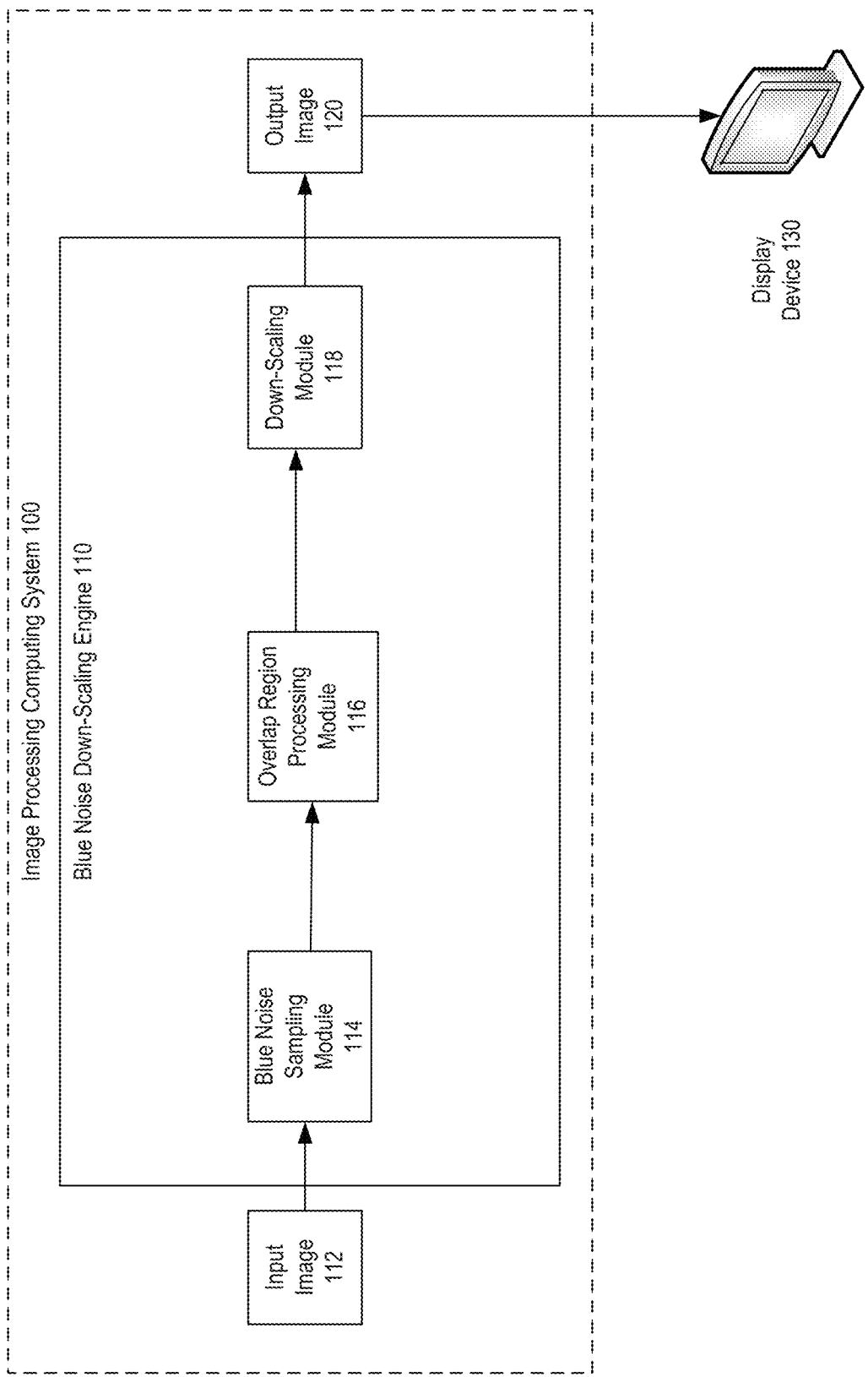
FIG. 1 depicts an example of an image processing computing system that performs down-scale resampling of images using blue noise sampling, according to certain embodiments of the present disclosure.

Certain embodiments involve down-scaling images by selecting pixel sets via blue noise sampling. For instance, a down-scaling operation involves selecting multiple sets of pixels from an image and combining color information from each set of pixels into a single target pixel. In a simplified example, a 16×16 pixel image would be down-scaled to a 4×4 pixel image by identifying four sets 4×4 sets of pixels, each of which is defined with respect to a center pixel or other source pixel, and combining each 4×4 pixel set into a respective target pixel. A down-scaling engine described herein applies a blue noise sampling operation to randomly select, subject to certain restrictions, the source pixels that define these image sets. Blue noise sampling operation ensures that the "random" selection still causes source pixels to be selected in a representative manner throughout the input image. The blue noise sampling engine also performs various processing operations to ensure that overlap between pixel sets does not cause the combination of color information from overlapping pixel sets to introduce significant aliasing or other artifacts into the output image.

The following non-limiting example is provided to introduce certain embodiments. In an example, an image processing system accesses an input image for down-scaling, such as an image having a height of 6 pixels height and a width of 9 pixels. The image processing system identifies source pixels for resampling by applying a blue noise sampling operation. The blue noise sampling operation randomly selects source pixels that are distributed throughout the input image. For instance, the blue noise sampling operation selects a first source pixel at location (3, 4) and a second source pixel at location (7, 3). Each source pixels defines a set of pixels that neighbor the source pixel. For instance, a first set of pixels is encompassed by a 5×5 grid centered around the first source pixel and a second set of pixels is encompassed by a 5×5 grid centered around the second source pixel. Since the blue noise sampling operation is randomized, some of these pixel sets could overlap. In the current example, a pixel at location (5, 6) would fall within both the 5×5 grid centered around the first source pixel and the 5×5 grid centered around the second source pixel, and would therefore be included in both pixel sets.

Continuing this example, a down-scaling operation used by the image processing system involves applying a weight matrix to each pixel set. For instance, a weight matrix for a convolution includes coefficients to be multiplied with pixels in a pixel set respectively. In the current example, a given 5×5 pixel set would be combined, via down-scaling, using a 5×5 weight matrix. But, in cases involving overlapping pixel sets, a pixel in the overlap region could be used in both a first convolution involving the first weight matrix and a second convolution involving the second weight matrix, which could introduce aliasing in an output image. To address this issue, the image processing system identifies overlap pixels included in both the first pixel set and second pixel set. The image processing system assigns, based on whether each overlap pixel is closer to the first source pixel or second source pixel, each overlap pixel to either the first set of pixels or the second set of pixels.

Continuing this example, the image processing system modifies the weight matrix associated with the first set of pixels to exclude pixels assigned to the second set of pixels, or vice versa. For instance, a particular overlap pixel could correspond to coefficient $x_1$ in the first weight matrix and coefficient $x_2$ in the second weight matrix. If the overlap pixel is assigned to the first pixel set, the image processing system the second weight matrix by setting the coefficient $x_2$ to zero. Doing so causes the overlap pixel to be excluded from a convolution operation involving the second pixel set, thereby reducing aliasing in the down-scaled output image. The image processing system applies the down-scaling operation by applying the first weight matrix to the first set of pixels and applying the second weight matrix, as modified, to second set of pixels. The down-scaling operation outputs a first target pixel computed from the first pixel set and a second target pixel computed from the second pixel set.

As used herein, the term "down-scaling operation" is used to refer to an image-processing operation that is applied to an input image and thereby create an output image having a lower resolution than the input image.

As used herein, the term "image" is used to refer to electronic data that visually depicts one or more content items. Examples of an image include an electronic version of a photograph, one or more frames of electronic video content, electronic graphical content generated or modified with drawing tools, etc.

FIG. 1 depicts an example of an image processing computing system 100 that performs down-scale resampling of images using blue noise sampling, according to some embodiments of the present disclosure. In this example, the image processing computing system 100 executes a blue noise down-scale resampling engine 110 that accesses an input image 112 and generates an output image 120 by down-scale resampling the input image 112. The blue noise down-scale resampling engine 110 uses blue noise sampling to determine source pixels used to down-scale an image, modifies the down-scale resampling algorithm to account for overlap regions caused by the blue noise sampling process, and performs the down-scale resampling operation. The resulting output image 120 is displayed at a display device 130.

The blue noise down-scale resampling engine 110 processes the input image 112 using a blue noise sampling module 114. Blue noise sampling is a method for determining a random set of source pixels to be used for the down-scale resampling operation, while ensuring that no source pixel is too close to another source pixel. A down-scale resampling operation involves grouping the pixels of an image into sets of pixels and, for each set of pixels, mathematically combining the color values within the set into color value for a target pixel representing the set. In a simplified example involving an image of 16 pixels, the 16 pixels are grouped into four sets of pixels, and each pixel set is combined into a respective target pixel such that the resulting down-scaled image has four target pixels.

A source pixel is a pixel selected to be the center pixel of a set of pixels of a down-scale resampling operation, so that a mathematical operation can be applied to the set of pixels to calculate the value of a single target pixel. The set of pixels around each source pixel is of a predetermined shape, such as a grid, such that the same operation can be performed on each set of pixels. Blue noise sampling creates a set of source pixels that are randomly determined, but with a degree of uniformity throughout the image. In some embodiments, this blue noise sampling operation can ensure that no source pixel is below a predetermined threshold in distance to another source pixel.

The blue noise sampling module 114 provides data identifying the selected source pixels to an overlap region processing module 116. Because the source pixels are selected at random, the regions surrounding each source pixel that will be processed through the down-scale resampling operation can overlap with the surrounding regions of adjacent source pixels. For example, two source pixels can be randomly selected such that a pixel lies within the grid surrounding both source pixels. If the down-scale resampling operation were to be performed without adjustment, the data from that pixel would be used in the calculation of to two different target pixels, causing that pixel to be weighted more heavily than pixels that are only found in the grid of a single source pixel. In these cases, an adjustment must be made to the down-scale resampling algorithm so that each pixel is only used by the down-scale resampling operation associated with one source pixel.

The overlap region processing module 116 provides, to the down-scale resampling module 118, information for accounting for overlap regions in the down-scale resampling operation. The down-scale resampling module 118 performs the down-scale resampling operation. The down-scale resampling module uses a kernel, or weight matrix, to perform the down-scale resampling by applying the weight matrix to the set of pixels to calculate target pixels in a convolution operation. The result is an output image 120, which can be displayed on a display device 130.

Figure 2:
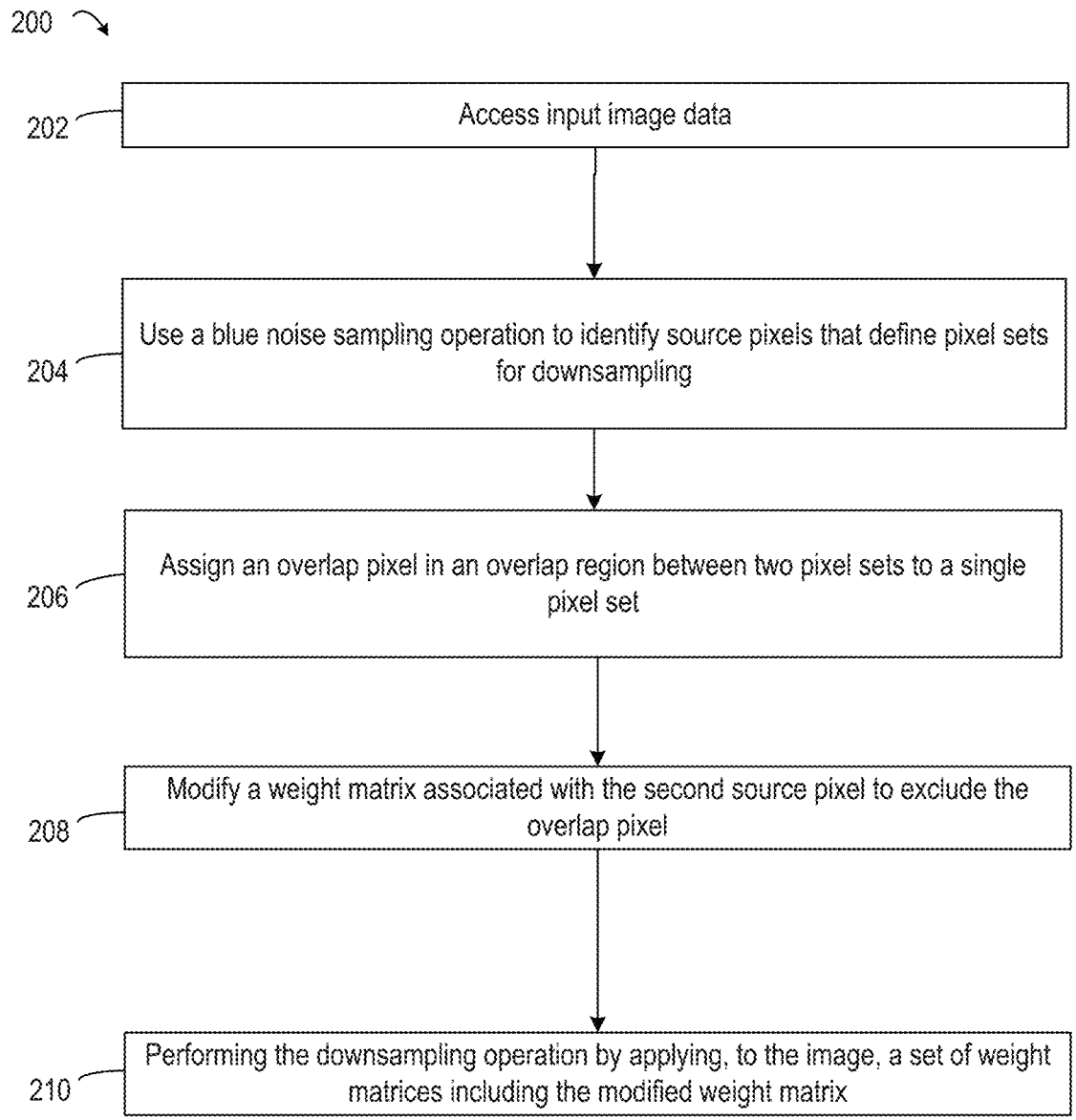
FIG. 2 depicts an example of a process for specifically down-scale resampling of images using blue noise sampling, according to some embodiments of the present disclosure.

FIG. 2 illustrates an example of a process 200 for specifically down-scale resampling of images using blue noise sampling, according to some embodiments of the present disclosure. A processing device is illustrated as implementing the operations of the process 200. Instructions for performing the operations of the illustrative flow can be stored as computer-readable instructions on a non-transitory computer-readable medium of the blue noise down-scale resampling engine 110. As stored, the instructions represent programmable modules (e.g., the blue noise sampling module 114 and the overlap region processing module 116) that include code or data executable by one or more processing devices. The execution of such instructions configures the blue noise down-scale resampling engine 110 to perform the specific operations shown in the figures and described herein. Each programmable module in combination with the processor represents a means for performing a respective operation. While the operations are illustrated in a particular order, it should be understood that no particular order is necessary and that one or more operations may be omitted, skipped, reordered, or some combination thereof.

At operation 202, where the blue noise down-scale resampling engine 110 accesses input image data. The input image data could be an input image 112 or image data derived from the input image 112. For example, the blue noise down-scale resampling engine 110 configures one or more processing devices to retrieve the input image data from a non-transitory storage medium. The non-transitory storage medium can be local to the image processing computing system 100 or remotely accessible via one or more data networks.

At operation 204, the blue noise down-scale resampling engine 110 determines, from the image data, source pixels that are in turned used to determine pixel sets for down-scale resampling. In image processing, blue noise refers to random sample sets that have uniform distributions. For example, the blue noise down-scale resampling engine 110 can perform bilateral blue noise sampling and thereby obtain source pixels that are random but are located uniformly throughout the image. The blue noise down-scale resampling engine determines a number of pixels surrounding each source pixel as a pixel set associated with the source pixel. The size of the weight matrix determines the size of the pixel set and the degree of down-scale resampling achieved in a single operation.

Figure 3:
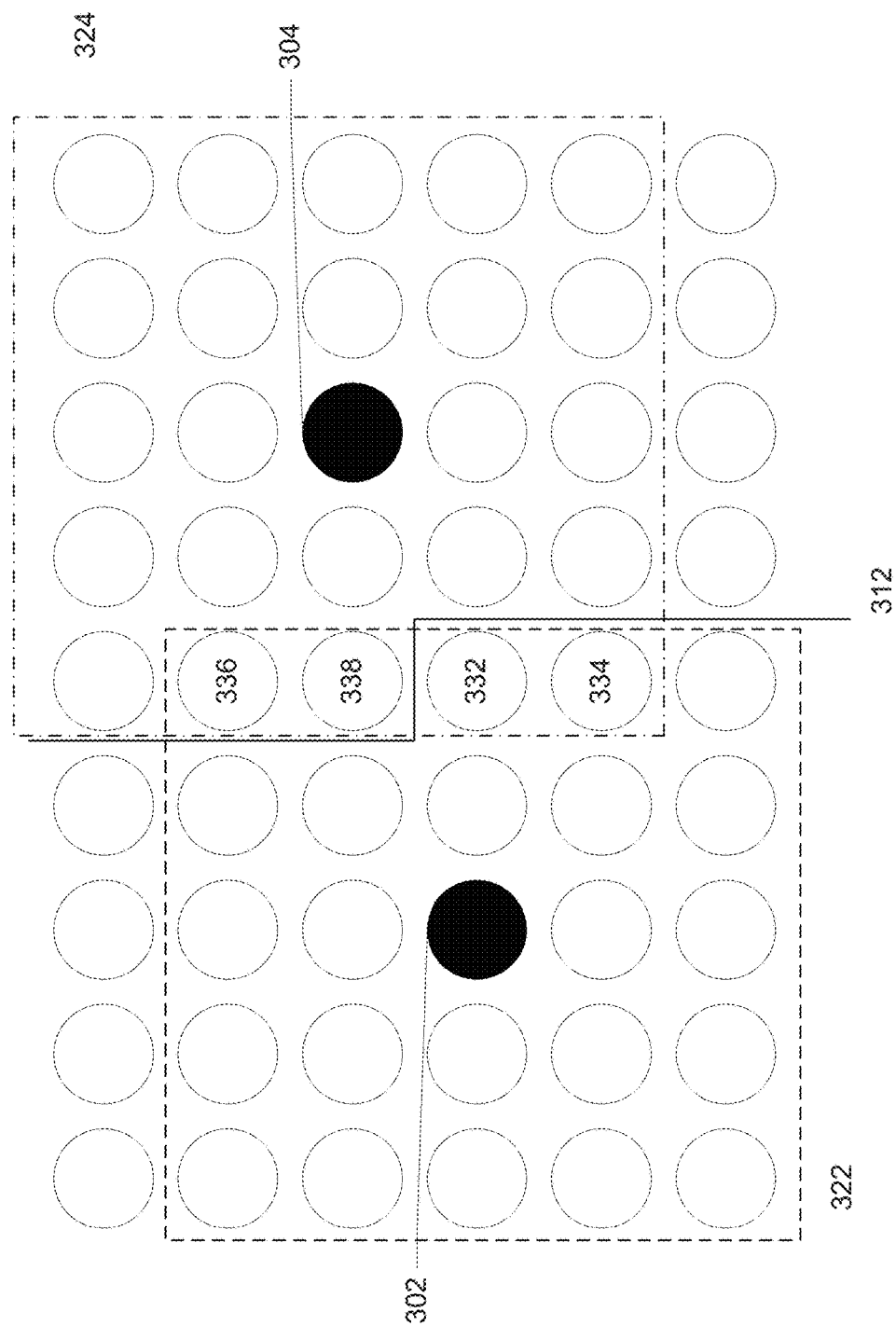
FIG. 3 depicts an example for down-scale resampling two adjacent pixel sets, according to certain embodiments of the present disclosure.

FIG. 3 illustrates an example for down-scale resampling two adjacent pixel sets. In this example, the blue noise sampling module 114 selected a first source pixel 302 and a second source pixel 304. A first weight matrix 322 and a second weight matrix 324 have been overlayed over their respective source pixels. In this example, the matrix size (kernel) is 5×5. Pixels within each weight matrix represent the pixels contained within each respective pixel set. As a result of the blue noise sampling, the location of the first source pixel 302 and the second source pixel 304 are close enough such that there are pixels that are part of both pixel sets, creating an overlap region. In this example, pixels 332-338 are within the overlap region.

Returning to FIG. 2, at operation 206, the blue noise down-scale resampling engine 110 assigns any pixels in the overlap region to a single pixel set. The blue noise down-scale resampling engine 110 associates each pixel the closest source pixel for each pixel in the overlap region. The association ensures that each pixel only contributes to the down-scale resampling operation once, so as not to allow the values of pixels in the overlap region to be overrepresented in the down-scaled image. This assignment identifies the weight matrix that needs to be modified in order to prevent a pixel from contributing to that portion of the down-scale resampling operation As in example, in FIG. 3, line 312 represents the division wherein the first source pixel 302 is the closest source pixels for all pixels to the left of line 312 and the second source pixel 304 is the closest source pixel for all pixels to the right of line 312. Pixels 332 and 334 are closer to the first source pixel 302 and pixels 336 and 338 are closer to the second source pixel 304. Thus, pixels 332 and 334 should not contribute to the down-scale resampling operation performed on the second pixel set, and pixels 336 and 338 should not contribute to the down-scale resampling operation of the first pixel set.

Returning to FIG. 2, at operation 208, the blue noise down-scale resampling engine 110 modifies each weight matrix so that any pixels in the overlap region that should not contribute to the down-scale resampling operation of the pixel set are excluded from contributing to the down-scale resampling calculation. For instance, the blue noise down-scale resampling engine 110 modifies each weight matrix based on the following:

$$E(s_i, s_j) = d_p(p_i p_j) \oplus d_w(W_i, W_j), \text{ where } d_w(W_i, W_j) \triangleq \sum_k W_{ik} W_{j(k-\delta)}$$

$E(s_i, s_j)$ is the bilateral energy combining position p with filter weights W. In this formula, k is the weight matrix index, and S is the difference in relative position calculated in operation 206. The engine then modifies the weight matrix to minimize $E(s_i, s_j)$.

As an example, let $\delta=(1, 0)$ for two adjacent pixels i and j with j to the right of i. Let:

$$W_i = \begin{bmatrix} 1 & 0 & 0 \\ 0 & 1 & 0 \\ 0 & 0 & 1 \end{bmatrix} \text{ and } Wj = \begin{bmatrix} 0 & 0 & 1 \\ 1 & 0 & 0 \\ 0 & 1 & 0 \end{bmatrix}$$

As the sample positions are predetermined by the blue noise sampling module 114, minimizing $E(s_i, s_j)$ means minimizing $d_w(W_i, W_j)$. For $W_i$ and $W_j$ above, $d_w(W_i, W_j)=2$. In this example, $W_j$ is modified such that $$Wj = \begin{bmatrix} 0 & 0 & 1 \\ 0 & 1 & 0 \\ 1 & 0 & 0 \end{bmatrix}.$$

The modification results in $d_w(W_i, W_h)=0$, thus minimizing $E(s_i, s_j)$.

In some embodiments the blue noise down-scale resampling engine 110 can minimize $E(s_i, s_j)$ using a combination of phase group sampling and multi-class blue noise sampling. An example of phase group sampling is described in Li-Yi Wei, "Parallel Poisson Disk Sampling," ACM Trans. Graph. 27, 3, Article 20 (August 2008), which is incorporated by reference herein. An example of multi-class blue noise sampling is described in Li-Yi Wei, "Multi-class Blue Noise Sampling," ACM Trans. Graph. 29, 4, Article 79 (July 2010), which is incorporated by reference herein.

With same-shaped kernels, for all i in $W_i$, $d_w(W_i, W_j)$ becomes 0 if each source sample is collected by no more than one target sample. Additionally, each source sample should be collected by at least one target sample to avoid waste. By minimizing $E(s_i, s_j)$, the blue noise down-scaling resampling engine 110 connects each source sample to exactly one target sample within its neighborhood defined by the shape of the filter W Under regular sampling such as pixel grid and finite filter kernel size, there is a finite number of $\delta_i = p_i - p_j$ between a source sample $s_i$ and target sample $s_j$, with the number determined by the filter W size and shape. The blue noise-downscale resampling engine 110 can thus assign a unique class id for each source sample $s_i$ indicating which $W_{ij}=1$ with the rest of $W_i=0$. There is a finite number of classes, for which targets sampling the same class of sources have non-overlapping kernel sizes, similar to the phase groups in [Wei 2008] (see FIG. 3 in Wei 2008). The blue noise down-scale resampling engine can then optimize the distributions of these groups using the discrete multi-class blue noise solver in [Wei 2010] (see FIG. 11 in Wei 2010).

Due to the symmetry of δ between any given pair of samples, blue noise source view as achieved above also implies blue noise target view. Specifically, two nearby target samples are likely to have different/decorrelated W, and each W is like to have irregular structures due to the stochastic nature of [Wei 2010]. This method minimizes $d_w(W_i, W_j)$ with blue noise distributions of the binary kernel W weights for all source/target samples.

For example, in FIG. 3, the blue noise down-scale resampling engine 110 modifies the first weight matrix 322 so that pixels 336 and 338 do not contribute to the convolution operation of the first pixel set using the first weight matrix. Similarly, the blue noise down-scale resampling engine 110 modifies the second weight matrix 324 so that pixels 332 and 334 do not contribute to the convolution operation of the second pixel set using the second weight matrix.

Returning to FIG. 2, at operation 210, the blue noise down-scale resampling engine 110 performs a down-scale resampling operation by applying a set of weight matrices that include modified weight matrices to the image. The blue noise down-scale resampling engine performs a convolution operation for each weight matrix associated with each source pixel by adding each pixel in a set of pixels, weighted by the kernel. Specifically, convolution includes flipping both the rows and columns of the kernel, multiplying the corresponding pixel, and summing the result of each multiplication. The result of the down-scale resampling operation is the value for a single target pixel. For example, the following matrices represent a set of pixels and a weight matrix of size 3×3:

$$\left( \begin{bmatrix} a & b & c \\ d & e & f \\ g & h & i \end{bmatrix} * \begin{bmatrix} 1 & 2 & 3 \\ 4 & 5 & 6 \\ 7 & 8 & 9 \end{bmatrix} \right)$$

The first matrix, $m_1$, with values a through i that respectively represent the respective color values for pixels. In this example, e represents value of the source pixel, and pixels a-d and pixels f-i represents the values of surrounding pixels. The second matrix, $m_2$, represents a 3×3 weight matrix. A convolution operation would create the following result in the following multiplication and summation of values:

$$m_1 * m_2 = (i \times 1) + (h \times 2) + (g \times 3) +$$
$$(f \times 4) + (e \times 5) + (d \times 6) + (c \times 7) + (b \times 8) + (a \times 9)$$

The convolution operation performed for each source pixels results in a set of target pixels that represents the down-scaled image.

Figure 4:
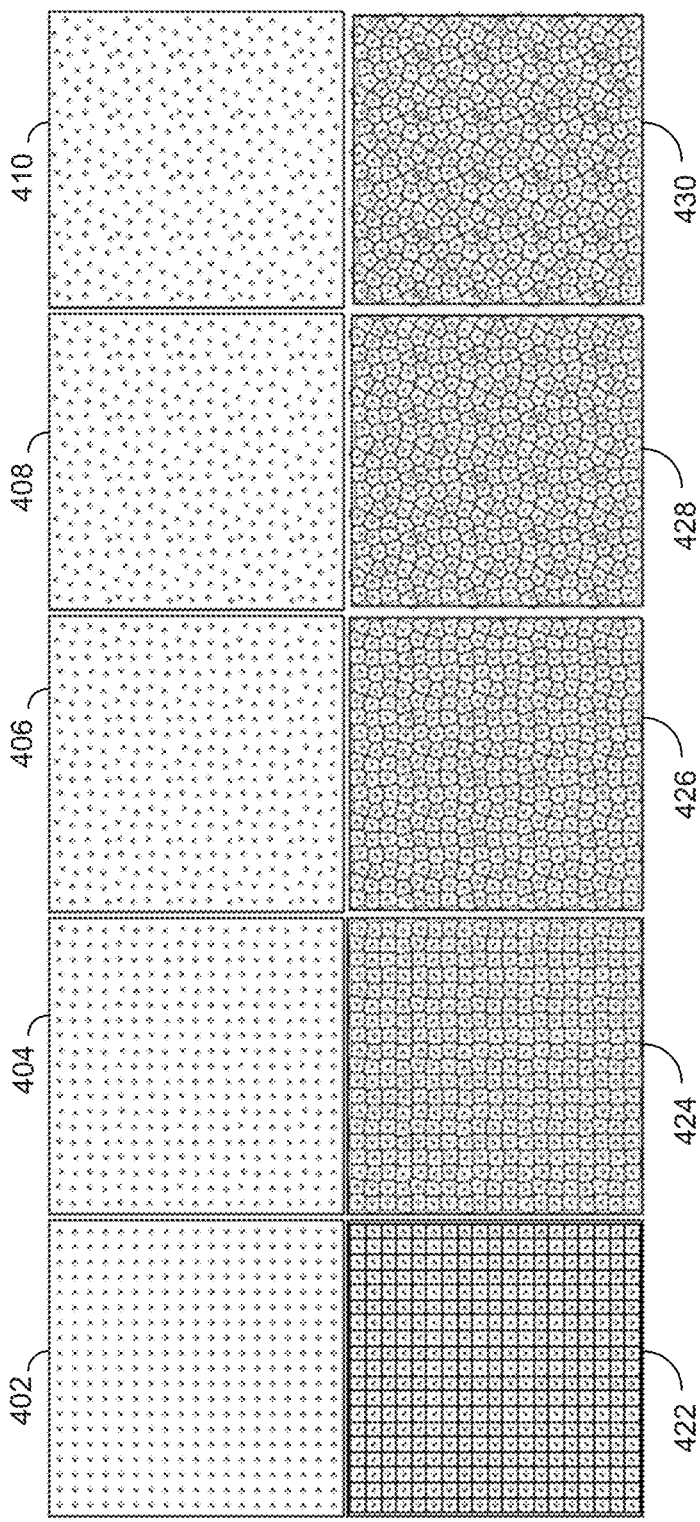
FIG. 4 depicts an example of source pixels selected based on a configurable degree of randomness, according to certain embodiments of the present disclosure.

In some embodiments, the distribution of source pixels can have a configurable degree of randomness between a regular grid and a blue noise distribution. FIG. 4 provides an example of source pixels selected based on a configurable degree of randomness. In FIG. 4, diagrams 402-410 represent examples of source pixels that have been identified by the blue noise sampling module 114 that has been configured to varying degrees of randomness. The degrees of randomness can range from regular grid sampling 402 to a full blue noise distribution 410. The remaining distribution of source pixels 404-408 represent levels of randomness in between the regular grid and blue noise sampling. In some embodiments, the blue noise sampling module 114 receives an addition parameter as input. This parameter is used to determine the level of randomness of the samples selected. This allows a sample that has uniform distribution but a level of randomness less than that of a true blue noise sample. In some embodiments, this can be achieved by interpolating sample positions between a regular grid and blue noise distribution. For example, regular grid sampling 402 can be achieved by interpolating the blue noise distribution with the regular grid distribution with a weight of 0. Blue noise sampling 410 can be achieved by giving the blue noise sampling a weight of 1. Results 404, 406, and 408 can be achieved by increasing the weight with increasing values between 0 and 1. In additional or alternative embodiments, this can be achieved by ensuring each sample is of at least a threshold distance for all other samples. At the maximum threshold distance, the sample would be equivalent to a regular grid sample. By adjusting the threshold distance down from the maximum, varying degrees of randomness could be achieved.

Additionally, diagrams 422-430 represent the Voronoi regions of the source pixels identified in corresponding diagrams 402-410. A Voronoi region is, for a given set of points, in this case, the set of source pixels, the region that encompasses all points that are closer to the point within the given set than any other point within the given set. Thus any other pixels (not shown) within each Voronoi region would be associated with the pixel set of the source pixel within that region.

For example, in FIG. 3, line 312 would also represent the edge of the Voronoi region between the first source pixel and the second source pixel. Pixels to the left of line 312 are within the Voronoi region of the first source pixel 302 because all points to the left of line 312 are closer to the first source pixel 302. Similarly, all pixels to the right of line 312 are within the Voronoi region of the second source pixel 304 because all points to the right of line 312 are closer to the second source pixel 304.

Examples of Experimental Results

Figure 5:
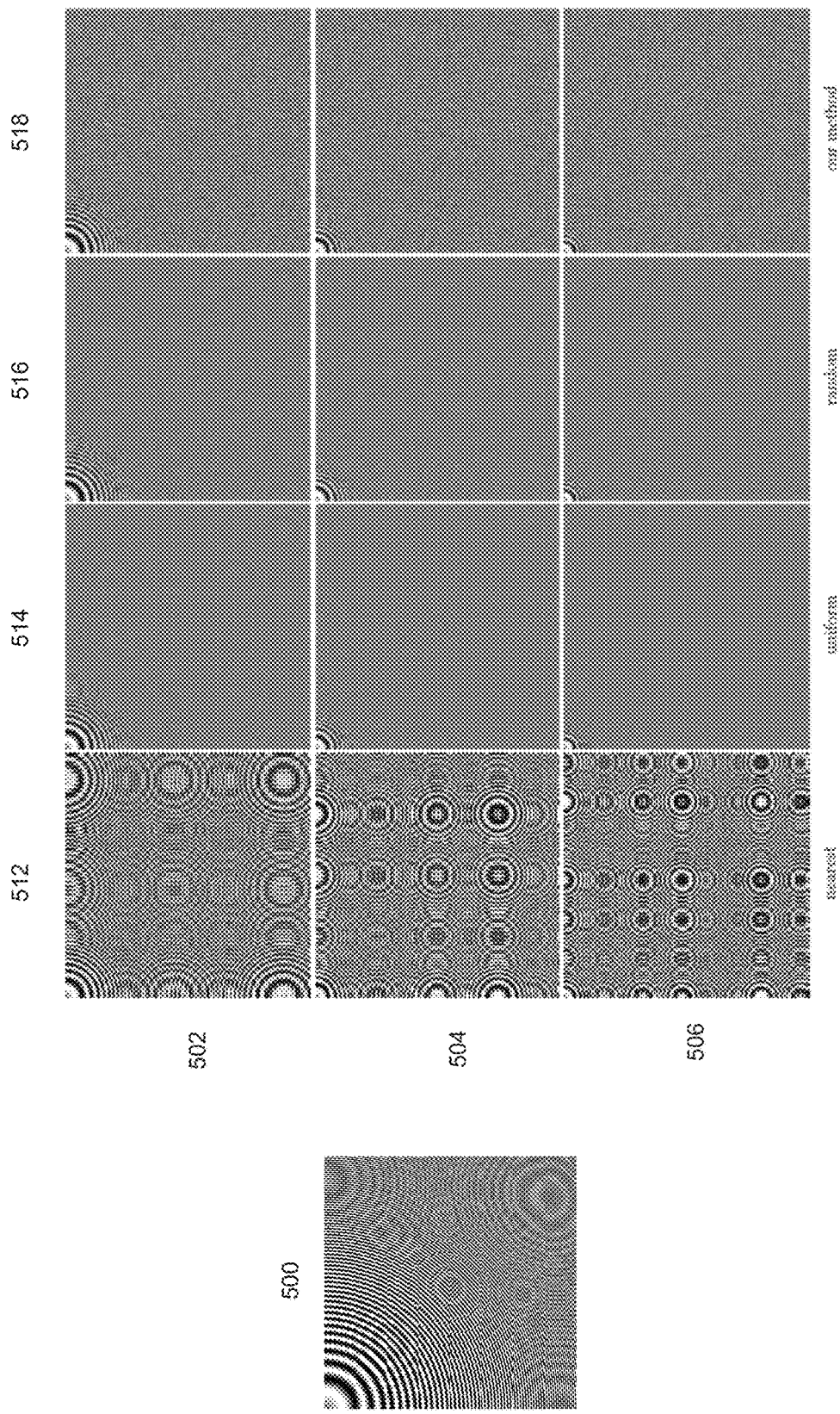
FIG. 5 depicts an example of an output of blue noise down-scaling techniques described herein as compared to outputs from existing down-scale resampling techniques, according to certain embodiments of the present disclosure.

FIG. 5 depicts an example of an output of a blue noise down-scale resampling engine 110, as described herein, compared to outputs from existing down-scale resampling techniques. In each case, the system generated an output image of 256×256 from an original image 510 of size 1024×1024 using different filter radii. Results in row 502 used a filter radius of 0.006 times the original input size, row 504 used a 5×5 kernel, and row 506 used a 3×3 kernel. But other radii and kernels sizes can be used. Column 512 used nearest neighbor sampling, column 514 used uniform weights, column 516 used random (white noise) sampling, and column 518 used blue noise sampling.

Example of a Computing System for Implementing Certain Embodiments

Figure 6:
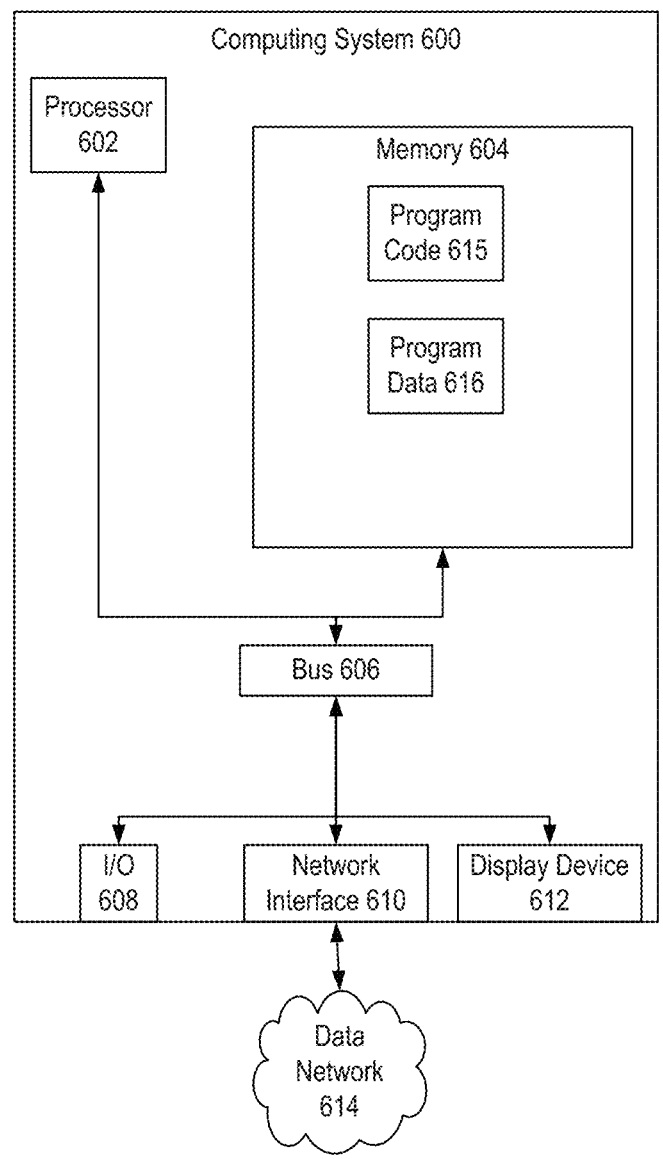
FIG. 6 depicts an example of a computing system for implementing one or more embodiments of the present disclosure.

Any suitable computing system or group of computing systems can be used for performing the operations described herein. For example, FIG. 6 depicts an example of the computing system 600. The implementation of computing system 600 could be used for an image processing computing system 100.

The depicted example of a computing system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

The memory device 604 includes any suitable non-transitory computer-readable medium for storing program code 615, program data 616, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 600 may also include a number of external or internal devices, such as input or output devices. For example, the computing system 600 is shown with one or more input/output ("I/O") interfaces 608. An I/O interface 608 can receive input from input devices or provide output to output devices, such as a presentation device 612. One or more buses 606 are also included in the computing system 600. The bus 606 communicatively couples one or more components of a respective one of the computing system 600.

The computing system 600 executes program code 615 that configures the processor 602 to perform one or more of the operations described herein. Examples of the program code 615 include, in various embodiments, the blue noise down-scaling engine 110 or other suitable applications that perform one or more operations described herein. The program code may be resident in the memory device 604 or any suitable computer-readable medium and may be executed by the processor 602 or any other suitable processor.

The computing system 600 can access program data 616 (e.g., an input image 112) in any suitable manner. In some embodiments, one or more of these data sets, models, and functions are stored in the same memory device (e.g., one of the memory devices 604). In additional or alternative embodiments, one or more of the programs, data sets, models, and functions described herein are stored in different memory devices 604 accessible via a data network.

The computing system 600 also includes a network interface device 610. The network interface device 610 includes any device or group of devices suitable for establishing a wired or wireless data connection to one or more data networks 614. Non-limiting examples of the network interface device 610 include an Ethernet network adapter, a modem, etc. The computing system 600 is able to communicate with one or more other computing devices via a data network 614 using the network interface device 610. Examples of the data network 614 include, but are not limited to, the internet, a local area network, a wireless area network, a wired area network, a wide area network, and the like.

In some embodiments, the computing system 600 also includes the presentation device 612 depicted in FIG. 6. A presentation device 612 can include any device or group of devices suitable for providing visual, auditory, or other suitable sensory output (e.g., display device 130). Non-limiting examples of the presentation device 612 include a touchscreen, a monitor, a speaker, a separate mobile computing device, etc. In some aspects, the presentation device 612 can include a remote client-computing device that communicates with the computing system 600 using one or more data networks described herein. Other aspects can omit the presentation device 612.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method that includes one or more processing devices performing operations comprising:
   accessing an input image from a memory device;
   transforming the input image into a down-scaled image, wherein transforming the input image comprises:
      identifying, by applying a blue noise sampling operation to the input image, a first source pixel defining a first set of pixels from the input image and a second source pixel defining a second set of pixels from the input image, wherein the first set of pixels and the second set of pixels have an overlap region comprising one or more overlap pixels, wherein the first set of pixels is associated with a first weight matrix for a down-scaling operation and the second set of pixels is associated with a second weight matrix for the down-scaling operation,
      assigning an overlap pixel in the overlap region to the first set of pixels based on the overlap pixel being closer to the first source pixel than the second source pixel,
      modifying the second weight matrix to exclude the overlap pixel from a portion of the down-scaling operation associated with the second set of pixels, and
      performing the down-scaling operation by combining the first set of pixels into a first target pixel based on the first weight matrix and combining the second set of pixels into a second target pixel based on the second weight matrix as modified; and,
   causing a presentation device to output the down-scaled image for display, wherein the down-scaled image is outputted by the down-scaling operation.

2. The method of claim 1, wherein applying the blue noise sampling operation further comprises:
   receiving a parameter indicating a degree of randomness for the blue noise sampling operation; and
   modifying the blue noise sampling operation based on the parameter.

3. The method of claim 2, wherein the blue noise sampling operation maintains a distance between the first source pixel and the second source pixel that exceeds a threshold distance, wherein the parameter comprises the threshold distance.

4. The method of claim 1, wherein performing the down-scaling operation further comprises performing (i) a first convolution operation with the first weight matrix and the first set of pixels and (ii) a second convolution operation with the second weight matrix, as modified, and the second set of pixels.

5. The method of claim 4, wherein the second convolution operation comprises (i) performing second multiplications of values in the second weight matrix, as modified, with respective color values from pixels in the second set of pixels and (ii) summing the second multiplications.

6. The method of claim 1, wherein modifying the second weight matrix further comprises:
   determining a bilateral energy based on a position of the first source pixel, a position of the second source pixel, the first weight matrix, and the second weight matrix; and
   modifying the second weight matrix to minimize the bilateral energy.

7. The method of claim 6, wherein minimizing the bilateral energy comprises minimizing a difference between the first weight matrix and the second weight matrix for the overlap pixel.

8. A system comprising:
   a processing device; and
   a non-transitory computer-readable medium communicatively coupled to the processing device,
   wherein the processing device is configured to execute program code stored in the non-transitory computer-readable medium and thereby perform operations comprising:
      accessing an input image from a memory device;
      transforming the input image into a down-scaled image, wherein transforming the input image comprises:
         identifying, by applying a blue noise sampling operation to the input image, a first source pixel defining a first set of pixels from the input image and a second source pixel defining a second set of pixels from the input image, wherein the first set of pixels and the second set of pixels have an overlap region comprising one or more overlap pixels, wherein the first set of pixels is associated with a first weight matrix for a down-scaling operation and the second set of pixels is associated with a second weight matrix for the down-scaling operation,
         assigning an overlap pixel in the overlap region to the first set of pixels based on the overlap pixel being closer to the first source pixel than the second source pixel,
         modifying the second weight matrix to exclude the overlap pixel from a portion of the down-scaling operation associated with the second set of pixels, and
         performing the down-scaling operation by combining the first set of pixels into a first target pixel based on the first weight matrix and combining the second set of pixels into a second target pixel based on the second weight matrix as modified; and,
      causing a presentation device to output the down-scaled image for display, wherein the down-scaled image is outputted by the down-scaling operation.

9. The system of claim 8, wherein applying the blue noise sampling operation further comprises:
   receiving a parameter indicating a degree of randomness for the blue noise sampling operation; and
   modifying the blue noise sampling operation based on the parameter.

10. The system of claim 9, wherein the blue noise sampling operation maintains a distance between the first source pixel and the second source pixel that exceeds a threshold distance, wherein the parameter comprises the threshold distance.

11. The system of claim 8, wherein performing the down-scaling operation further comprises performing (i) a first convolution operation with the first weight matrix and the first set of pixels and (ii) a second convolution operation with the second weight matrix, as modified, and the second set of pixels.

12. The system of claim 11, wherein the second convolution operation comprises (i) performing second multiplications of values in the second weight matrix, as modified, with respective color values from pixels in the second set of pixels and (ii) summing the second multiplications.

13. The system of claim 8, wherein modifying the second weight matrix further comprises:
   determining a bilateral energy based on a position of the first source pixel, a position of the second source pixel, the first weight matrix, and the second weight matrix; and
   modifying the second weight matrix to minimize the bilateral energy.

14. The system of claim 13, wherein minimizing the bilateral energy comprises minimizing a difference between the first weight matrix and the second weight matrix for the overlap pixel.

15. A non-transitory computer-readable medium having program code that is stored thereon, the program code executable by one or more processing devices for performing operations comprising:
   accessing an input image from a memory device;
   transforming the input image into a down-scaled image, wherein transforming the input image comprises:
      identifying, by applying a blue noise sampling operation to the input image, a first source pixel defining a first set of pixels from the input image and a second source pixel defining a second set of pixels from the input image, wherein the first set of pixels and the second set of pixels have an overlap region comprising one or more overlap pixels, wherein the first set of pixels is associated with a first weight matrix for a down-scaling operation and the second set of pixels is associated with a second weight matrix for the down-scaling operation,
      assigning an overlap pixel in the overlap region to the first set of pixels based on the overlap pixel being closer to the first source pixel than the second source pixel,
      modifying the second weight matrix to exclude the overlap pixel from a portion of the down-scaling operation associated with the second set of pixels, and
      performing the down-scaling operation by combining the first set of pixels into a first target pixel based on the first weight matrix and combining the second set of pixels into a second target pixel based on the second weight matrix as modified; and,
   causing a presentation device to output the down-scaled image for display, wherein the down-scaled image is outputted by the down-scaling operation.

16. The non-transitory computer-readable medium of claim 15, wherein applying the blue noise sampling operation further comprises:
   receiving a parameter indicating a degree of randomness for the blue noise sampling operation; and
   modifying the blue noise sampling operation based on the parameter.

17. The non-transitory computer-readable medium of claim 16, wherein the blue noise sampling operation maintains a distance between the first source pixel and the second source pixel that exceeds a threshold distance, wherein the parameter comprises the threshold distance.

18. The non-transitory computer-readable medium of claim 15, wherein performing the down-scaling operation further comprises performing (i) a first convolution operation with the first weight matrix and the first set of pixels and (ii) a second convolution operation with the second weight matrix, as modified, and the second set of pixels.

19. The non-transitory computer-readable medium of claim 18, wherein the second convolution operation comprises (i) performing second multiplications of values in the second weight matrix, as modified, with respective color values from pixels in the second set of pixels and (ii) summing the second multiplications.

20. The non-transitory computer-readable medium of claim 15, wherein modifying the second weight matrix further comprises:
   determining a bilateral energy based on a position of the first source pixel, a position of the second source pixel, the first weight matrix, and the second weight matrix; and
   modifying the second weight matrix to minimize the bilateral energy, wherein minimizing the bilateral energy comprises minimizing a difference between the first weight matrix and the second weight matrix for the overlap pixel.

* * * * *